May 21, 1935.  C. E. BEDAUX  2,001,863
AUTOMOBILE DOOR
Original Filed April 27, 1933  2 Sheets-Sheet 1

Fig. 1.

INVENTOR
Charles E. Bedaux
BY
Gifford, Scull & Burgess
ATTORNEYS

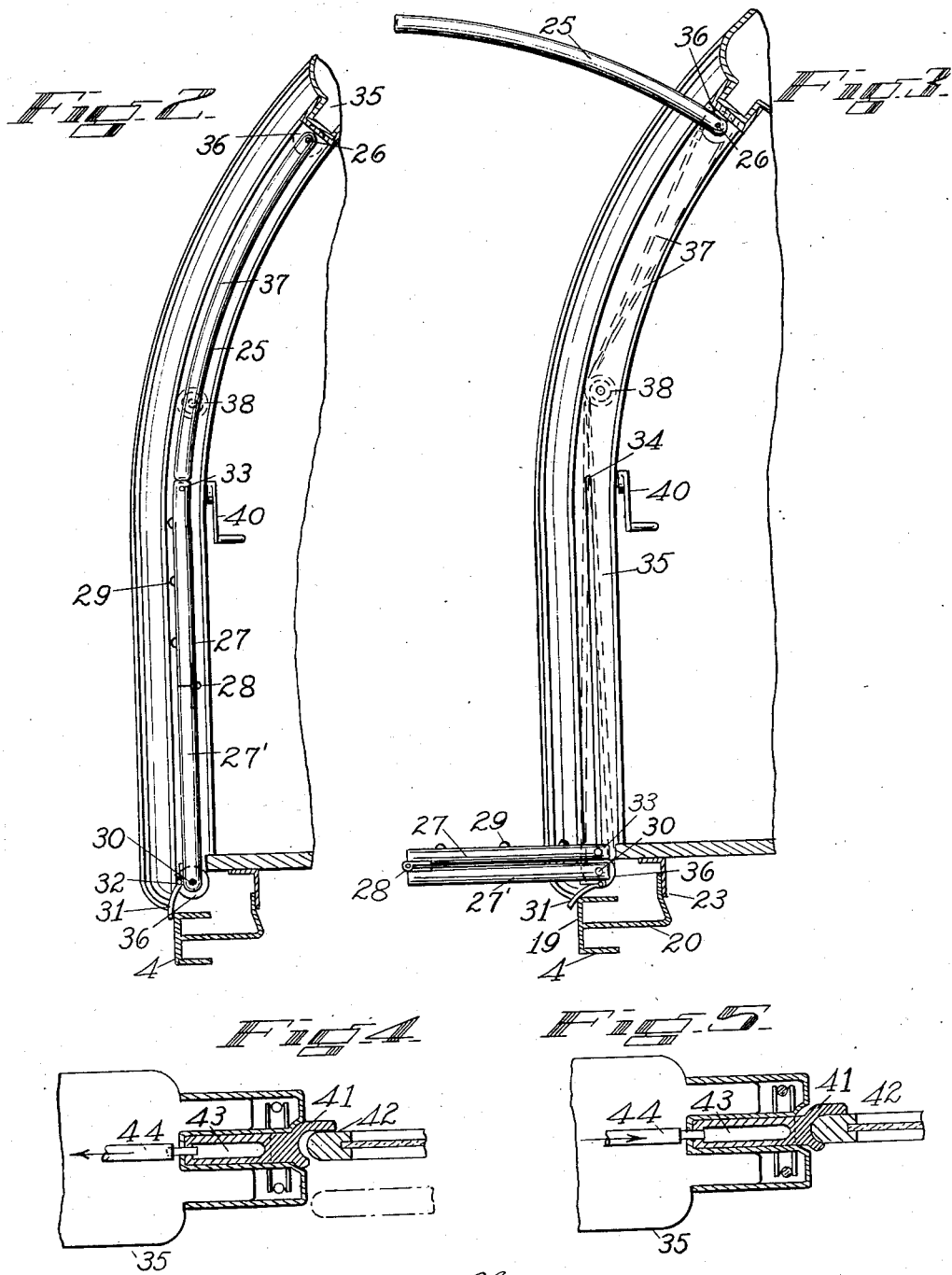

Patented May 21, 1935

2,001,863

UNITED STATES PATENT OFFICE 2,001,863

AUTOMOBILE DOOR

Charles E. Bedaux, Monts, France

Original application April 27, 1933, Serial No. 668,184. Divided and this application November 16, 1933, Serial No. 698,306

6 Claims. (Cl. 296—44)

This invention relates to a door and is especially concerned with the door of an automobile which may be used as a step when it is open and can be made air-tight when closed. This is a division of my application, Ser. No. 668,184, filed April 27, 1933.

The invention will be understood from the description in connection with the accompanying drawings in which Fig. 1 is a side view partly broken away of an illustrative embodiment of the invention showing edges of the body around the door; Fig. 2 is an edge view of the door and framework; Fig. 3 is a view similar to Fig. 2 with the door open; Fig. 4 is a section on an enlarged scale, partly broken away, along the line 4—4 of Fig. 1; and Fig. 5 is a view similar to Fig. 4 showing parts in another position.

In the drawings reference character 1 indicates a portion of an automobile body.

A rigid framework 4 is attached to the chassis (not shown) and the body 1 is in turn attached to this framework so that the body 1 is supported and carried by the chassis and framework 4.

The door for the car is shown in the illustrative embodiment of the invention as being made in three sections. The upper section 25 is hinged at its upper edge so that when it is opened around the hinge or pivot shaft 26 it will extend approximately horizontally and form a shelter for the users of the car entering and leaving the same. The lower sections 27 and 27' of the door are hinged together at 28 and fold together, as indicated in Fig. 3 when the door is open, thus forming a step for the car. The section 27 is provided with lattice or slats 29 to avoid slipping when this section is used as a step. The lower edge of the section 27' is mounted on a shaft 30 pivoted in the door frame. A flap or plate 31 is hinged to the section 27', as indicated at 32, near the lower edge of this section to close the space between the section 27' of the door and the framework 4 when the door is closed.

Pins 33 extend from opposite sides of the section 27 of the door near the upper edge thereof. These pins 33 slide in grooves 34 in the door frame 35.

Grooved pulleys 36 are fixed on the ends of the shafts 26 and 30, which shafts extend into the hollow door frames 35. Cords 37 pass around the corresponding pulleys 36 at the ends of the shafts 26 and 32 and guide sheaves 38 are provided for the cords 37 in the curved hollow door frames.

The cords 37 are attached to the pins 33, as indicated at 39, so that when the shaft 26 is turned by the handle 40 or in any other convenient way to open the door or raise the section 25, the sections 27 and 27' will be simultaneously lowered.

Movable rubber inserts 41 may be placed in grooves in the door frames 35 to fit the edges 42 of the door sections. Expansible rubber tubes or bags 43 are located behind the inserts 41 with air connections 44 so that compressed air may be admitted to move the inserts 41 outwardly into contact with the edges of the door when the door is in the closed position. In this way an air-tight condition may be maintained between the edges of the door and the door frame and the door is prevented from rattling.

Instead of having the upper section of the door pivoted at its upper edge, this section may be made in two or more sections and caused to slide upwardly and outwardly into the open position to provide shelter for passengers. The lower section 27' of the door may also be provided with an auxiliary step, if desired, that would be nearer the ground in the open position of the door than the section 27 is.

I claim:

1. A sectional automobile door, means substantially parallel to the edges of the door connected to both of said sections to move one section upwardly into position to form a shelter and another section downwardly to form a step, and means to move a rubber closure member into contact with an edge of said door when it is closed.

2. A sectional automobile door, means substantially parallel to the edges of the door connected to both of said sections to move one section upwardly into position to form a shelter and another section downwardly to form a step, and means to move a rubber closure member into contact with an edge of said door when it is closed, said last-named means comprising a pneumatically operated member.

3. A vehicle door having two sections, one of said sections being pivoted at the bottom to the frame of said door, the other section having its lower edge hingedly connected to the upper edge of said pivoted section so that said sections can be folded together, and slats on the outside of said last-named section, said sections being adapted to form a step for entering the vehicle when they are folded together.

4. A door having two sections, one of said sections being pivoted at the bottom to the frame of said door so as to swing into a substantially horizontal position, the other section having its lower edge hingedly connected to the upper edge of said pivoted section, and a flap pivoted on said first-named section.

5. A door having two sections, one of said sections being pivoted at the bottom to the frame of said door, the other section having its lower edge hingedly connected to the upper edge of said pivoted section, and operating mechanism for simultaneously operating said sections, said operating mechanism comprising shafts in the door frame rigidly connected to said sections and a cord connecting said shafts.

6. A door having two sections, one of said sections being pivoted at the bottom to the frame of said door, the other section having its lower edge hingedly connected to the upper edge of said pivoted section, and a flap pivoted on said first-named section near its bottom pivot, said sections and a flap closing at least a portion of the door space when in extended positions.

CHAS. E. BEDAUX.